US005518638A

United States Patent [19]

Buil et al.

[11] Patent Number: 5,518,638

[45] Date of Patent: May 21, 1996

[54] FIRE EXTINGUISHING AND PROTECTION AGENT

[76] Inventors: Jurgen Buil, Heldstrasse 19, Kleve, Germany, 47533; Gernot Lohnert, Rottweg 16, Hamminkeln, Germany, 46499

[21] Appl. No.: 480,735

[22] Filed: Jun. 7, 1995

Related U.S. Application Data

[63] Continuation of Ser. No. 90,103, filed as PCT/DE92/00070, Feb. 4, 1992, abandoned.

[30] Foreign Application Priority Data

| | | | |
|---|---|---|---|
| Feb. 5, 1991 | [DE] | Germany | 41 03 388.4 |
| Jun. 10, 1991 | [DE] | Germany | 41 18 888.8 |
| Oct. 23, 1991 | [DE] | Germany | 41 34 870.2 |

[51] Int. Cl.$^6$ .............................. A62D 1/00; A62D 1/06; B01J 13/00

[52] U.S. Cl. .............................. 252/2; 252/4; 252/8.05; 252/610; 252/611; 252/601; 252/315.6; 252/315.01

[58] Field of Search .............................. 252/2, 8.05, 610, 252/611, 601, 315.01, 315.1, 315.6

[56] References Cited

U.S. PATENT DOCUMENTS

| | | | |
|---|---|---|---|
| 3,074,883 | 1/1963 | Letterton | 252/2 |
| 3,334,045 | 8/1967 | Nelson | 252/2 |
| 3,912,647 | 10/1975 | Adell | 252/8.05 |
| 3,976,580 | 8/1976 | Kaminstein et al. | 252/2 |
| 4,173,538 | 11/1979 | Herbline | 252/8 |
| 4,600,744 | 7/1986 | Libor et al. | 524/446 |

FOREIGN PATENT DOCUMENTS

| | | |
|---|---|---|
| 54-071900 | 8/1979 | Japan . |
| 1349508 | 4/1974 | United Kingdom . |

*Primary Examiner*—Gary Geist
*Assistant Examiner*—Joseph D. Anthony
*Attorney, Agent, or Firm*—Marshall & Melhorn

[57] ABSTRACT

The invention concerns the production and use of thickened synthetic amorphous silica in water as a fire extinguishing and protection agent in which the water is mixed with 1% to 9% by weight of fumed silica, and the resulting thin fluid suspension is rapidly thickened with mixing and shearing by the addition of from 0.003% to about 0.5% by weight of an additive selected from the group consisting of polyethylene glycols, polypropylene glycols, and their derivatives thereof, wherein the additive has a molar mass between 700 and 600,000.

12 Claims, No Drawings

FIRE EXTINGUISHING AND PROTECTION AGENT

This application is a continuation of application Ser. No. 08/090,103, filed as PCT/DE92/00070, Feb. 4, 1992, now abandoned.

BACKGROUND OF THE INVENTION

1. Field of the Invention

The present invention relates to a fire extinguishing composition formed by thickened water, and more particularly, to a highly liquid suspension of silica in water which is further thickened upon discharge.

2. Summary of the Related Art

As an extinguishing agent water has the advantages of high heat absorbing capacity and therefore favourable cooling action, a lack of toxicity, compatibility with many flammable materials, inexpensiveness and usually a good availability. It is therefore still an important fire extinguishing agent.

A known disadvantage of water as an extinguishing agent is its highly liquid nature, so that during the extinguishing process large quantities flow away unused and in part cause unnecessary water damage. Therefore only a small part of the sprayed water has its favourable extinguishing action consisting of cooling the burning material. Therefore numerous attempts have been made to improve water as a fire extinguishing agent.

Thus, for example, the addition of substances have been described, which bring about a rise in its viscosity, such as cellulose derivatives, alginates or water-soluble synthetic polymers such as polyacrylamide. Use is also made of non-flammable mineral additives to the extinguishing water, e.g. water-soluble inorganic salts or water-insoluble materials such as bentonite or attapulgite (cf. Ullmanns Enzyklopädie der Technischen Chemie, 4th edition, Vol. 11, p.569 and Ullmanns Encyclopedia of Industrial Chemistry, 5th edition, Vol. A 11, pp. 114/5).

In special cases, such as when fighting forest fires, use is e.g. made of bentonite, attapulgite and water-soluble salts as well as extinguishing water formulations mixed with alginates and which after special preparation are frequently ejected from aircraft (cf. e.g. C. E. Hardy, Chemicals for Forest Fire Fighting, 3rd edition, Boston, 1977). Due to numerous disadvantages such extinguishing agents have only proved significant for fighting forest fires and cannot be used for general purposes.

The reasons are e.g. the generally necessary high weight percentages of mineral additives in order to achieve a sufficiently high level of thickening (e.g. 10 to 20% by weight), the corrosive action of certain salts such as sulphates or chlorides, or the possibility of undesired environmental influences occurring, e.g. of fertilizing components, whose quantity application on quenching a forest fire can e.g. be a multiple per surface area of the fertilizer application in agriculture. The preparation of such thickened special extinguishing agents generally requires special apparatus and particularly this applies with respect to the mixing thereof. They can in general not be applied using conventional fire extinguishing syringes and e.g. in the case of alginate gums do not have an optimum adhering action to the surfaces following spraying, particularly under the action of heat, they frequently change their use characteristics after even a short storage period and, after drying, sometimes leave behind difficulty removable residues.

The preparation of a thickened extinguishing water without these disadvantages, particularly a non-flammable thickening agent for the water in order to improve the water extinguishing action, is therefore highly desirable. Apart from the positive effects of adhesion to surfaces, even in the case of elevated temperatures, the formation of cohesive extinguishing agent films with a particularly high water percentage and sufficiently high stability, chemical and physiological compatibility with all dead and living materials occurring during the extinguishing process, it must maintain its use properties even after prolonged storage and, if necessary, must be preparable in a rapid, inexpensive manner by mixing with ordinary water and must be applicable using conventionally available fire extinguishing equipment. At present there is no efficient fire extinguishing agent, which satisfies all these requirements.

Certain of the requisite characteristics such as a broad compatibility with living and dead material are e.g. fulfilled by amorphous silica or silicic acid, so that the latter is not only widely used as a thickening agent (cf. Ullmanns Enzyklopädie der Technischen Chemie, 4th edition, Vol. 22, p. 473; Kirk-Othmers Encyclopedia of Chemical Technology, Vol. 20, p. 778; H. Brünner, D. Schutte, Chemiker Ztg. 89, 1965, pp. 437–40; H. Fratzscher, Farbe und Lack, 75, 1969, pp. 531–538). It has a particularly marked thickening action in the form of fumed silica prepared by flame hydrolysis in non-polar liquids. In polar liquids such as water the thickening action of said silica is less pronounced, so that it is necessary to add relatively large quantities for obtaining a significant thickening action. It is as yet not known to use silicas in the form of an aqueous suspension as fire extinguishing agents. Fumed silica is only described as a pulverulent special extinguishing agent for special fire situations (EUR 0339 162 A1 or EUR 0311 006 A1). As a result of its extreme lightness, its general use as an extinguishing agent is not practicable.

If e.g. fumed silica is suspended in water, much more than 10% is necessary in order to obtain a usable thickening and this suspension also behaves in a thixotropic manner. This is a disadvantage for use with standard fire extinguishing equipment. If e.g. a 5% suspension of fumed silica in water is sprayed from different spraying means, liquids passing thinly out of the nozzles are always obtained and they run off surfaces in the same way as water. In extinguishing comparison tests on standardized fires, such unthickened silica suspensions have no better action than water.

SUMMARY OF THE INVENTION

It is also known that suspensions of amorphous synthetic silicas in water over a period of time (generally weeks or months) slowly have a tendency to the agglomeration of particles and to settling phenomena. However, this "thickening effect" is unimportant for the present set problem as a result of its slowness and limited extent. This process, although it can be accelerated somewhat by adding electrolytes, does not represent a solution of the present problem. Such suspensions thickened by leaving to stand also become highly liquid again as a result of stirring following prolonged storage, i.e. when spraying using conventional fire extinguisher syringes said thixotropic liquefaction is disadvantageous, because it greatly impairs the adhesion of the water thickened in this way. As shown, an e.g. 4% suspension of fumed silica in water, following thickening as a result of storage, becomes highly liquid again on spraying.

The problem therefore arises of providing an improved fire extinguishing agent of the type of a thickened extinguishing water, particularly having an only limited weight percentage of synthetic amorphous silica or other, non-flammable, broadly compatible minerals in the form of a suspension in water so as to obtain a thickening, which takes place instantaneously and in a controllable manner, gives a clearly defined and stable final state and is not so thixotropized by the spraying process that its adhesion action is impaired. It must also be usable with conventional fire extinguishers and its preparation must not require special equipment, whilst having a good adhesive action to both vertical and downwardly directed surfaces, especially at elevated temperatures. In particular, its extinguishing action must be far superior to that of water.

For solving this problem it has been found that the preparation of a thickened suspension of amorphous, synthetic silica or bentonite in water is possible by mixing 1 to 9% pulverulent, fumed silica or bentonite with water, as well as 0.003 to 1.5% of a compound of the type of a polyethylene glycol with a molar mass of >700 to <600,000, derivatives of polyethylene glycol such as its ethers with fatty alcohols, its ester with fatty acids, ethers with carbohydrates having molar masses of 300 or higher, and with polyethylene imine. The necessary silica or bentonite concentrations in water are very low. They only represent a fraction of the amounts normally required for thickening in aqueous suspension, namely 1 to 9% compared with >>10%.

The said additives can be added to the highly liquid suspension of silica in water, to the actual water, but can also be dry premixed with the silica. In all cases an instantaneously usable, thickened extinguishing water is obtained, which can be further thickened in controlled manner, e.g. by the shearing action present in a fire extinguishing pump, without any impairing of the spraying capacity. On the contrary, as a result of the flow characteristics obtained of the thus thickened extinguishing water, compared with conventional water, its spraying characteristics are improved, e.g. with respect to the range or lower frictional losses.

The last process can be referred to as rheopexy. As the additional thickening obtained here is not lost again when the shearing action is stopped, reference could be made to an "irreversible rheopexy". As a result the use of the presently described thickened suspension of amorphous, synthetic silica as a fire extinguishing agent is particularly effective, because in a very short time with a normal extinguisher large surfaces can be thickly covered with the highly efficient extinguishing agent, no matter from what material they are made or which geometrical position they have. Under the action of heat there is no decomposition of said coating, such as a softening or slipping off up to the drying of the water.

The water thickened in the above manner has a number of essential advantages, such as ease of spraying or sprinkling by means of various types of fire extinguishing pumps or syringes in accordance with DIN (bucket syringe/TS 2/5), as well as by means of a high pressure pump having a working pressure of 100 bar, applicability from hand fire extinguishers, adhesion of even thick extinguishing agent layers of several centimetres up to the evaporation or drying on vertical and downwardly directed surfaces having different characteristics and made from different materials. At the end of the fire fighting measures the extinguishing agent can be easily removed in damage-free manner from the substrates in question, e.g. by spraying off with water or by suction using conventional industrial suction equipment. As the thickened extinguishing water is not lost through running away, it can be taken up again following the extinguishing process, so that contamination of the environment by products of the fire flowing away with the extinguishing water and also water damage to buildings can be limited. After drying the silica gel left behind has adsorbing characteristics, which can also be advantageous for taking up decomposition products of the fire or other contaminants.

It is particularly advantageous to utilize this property of the fire extinguishing agent according to the invention by sucking in the dry premix of the amorphous silica with the thickener in an extinguishing water flow, the desired thickening taking place instantaneously. It is noteworthy that an addition of slightly more than 1% of e.g. fumed silica to the water is adequate for this purpose.

For certain applications it can also be advantageous to use larger silica quantities in water, e.g. in order to form with the extinguishing agent a barrier against the uncontrolled flowing out of liquids from the fire area or the sucking up action of the silica for any contaminants present. Above 7% silica in the water when using conventional extinguishers no longer applicable pastes form, but these can be used as fire protection masses, because their homogeneity is retained even when there is a high water content and a low silica content. A silica gel obtained from water glass by neutralizing and washing or by ion exchange and given a pasty setting is only homogeneous for a short time after preparation and then quickly starts to give off water in considerable quantities. The fire protection mass prepared according to the invention avoids this phenomenon in the case of a high water and low solid percentage. These fire protection masses are suitable in numerous ways for preventative fire protection for flammable structures, in fire-retarding barrier elements or cable lines, particularly those which are sensitive to corrosion, fire decomposition products or outflowing water.

The "thickening additives" used according to the invention are required in all cases in only extremely small weight concentrations. With the preferably used proportions of only 0.003 to 0.5%, based on the total quantity, they are scarcely noticed. Several of the thickening additives described are conventionally used as emulsifiers, e.g. for greases, waxes or as special surfactants. The "flocculation" of silica by polyglycol is considered useful e.g. for water purification. It cannot be concluded from existing teachings that a suspension of silica or bentonite of above 1% in water can suddenly be made to uniformly thicken through the indicated compounds of polyethylene glycols or hydroxyethylated fatty acid, fatty alcohol or sugar derivatives or polyethylene imine, in the case of the smallest weight percentages thereof and that the thickening action obtained can be maintained for an almost unlimited time, so that the thus obtained extinguishing agents can be stored or used in stationary extinguishing equipment, or that the shear actions occurring during extinguishing do not act in the form of a thixotropizing and instead produce a type of "irreversible rheopexizing", which greatly favours the use as an extinguishing agent by producing stable, adhering water layers. This is surprising because the aforementioned compounds are not of the conventional thickener type.

It is also indicative for the present invention that the described thickening no longer occurs at concentrations of the thickening additives of the polyether type above certain limits (>1.5%) or that the addition of concentrations of thickening additives of the polyether type above these values to already thickened suspensions brings about their immediate and permanent dilution or thinning. However, this is not a problem in practice, because addition can be easily monitored.

An increased pH-value has a similar action on the effect of the polyether type thickening agent. At pH-values above 8.6 there is a reliquefaction of already thickened suspensions, which is also not disadvantageous, because for the easy handling of the extinguishing agent the pH-value is chosen as close as possible to the neutral point. Components acting in a highly alkaline manner can consequently not be added to the thickened extinguishing agent formulations when using polyoxyethylene derivatives.

In the case of polyethers as thickening additives an exception is formed by compounds having a weak alkaline action such as bicarbonates. They are compatible with the thickened suspensions of amorphous, synthetic silica in any soluble concentration. For example, potassium hydrogen carbonate can be added up to its saturation concentration of approximately 34%. During extinguishing these bicarbonates can decompose, accompanied by the release of carbon dioxide, which increases the extinguishing action. The suspensions of amorphous, synthetic silica thickened according to the invention are also compatible with other, not strong alkaline salts, e.g. preparation can without difficulty take place with sea water, or potassium sulphate, ammonium phosphate or boric acid can be dissolved in the thickened suspension.

Whereas the thickening additive polyethylene imine brings about a stable thickening action in the aqueous silica suspension in all alkaline ranges, there is a reliquefaction in the strong acid range. In any case, acid conditions are avoided to prevent corrosion.

A further possiblity of preparing a thickened suspension of amorphous silica in water suitable for fire extinguishing purposes is the dispersion of gelled silica sols prepared from water glass by neutralization. If said silica sols are not stabilized they have a felling tendency, i.e. they tend to form a cohesive gelatinous mass. However, particularly with low concentrations this gelling is difficult to control and such gelatinous masses are unsuitable for the present purpose, because they have a poor adhesion to surfaces and over a period of time separate the water contained therein and gradually harden. At the time of formation their particles are generally not displaceable against one another, i.e. there are no flow characteristics. By dispersing such silica gelatinous masses, particularly in aged form, thickened, aqueous silica suspensions in part suitable for the present fire extinguishing purposes can be prepared. These thickened suspensions of synthetic, amorphous silica prepared via neutralization processes do not behave in a rheopectic manner like those prepared from fumed silica.

They are suitable in those situations, where the rapid uncomplicated preparation in situ or direct preparation in the fire extinguishing process is not as decisive as the filling of fire extinguishers or stationary extinguishing equipments.

In solving the set problem of providing an effective and widely compatible fire extinguishing agent based on a thickened extinguishing water it has been found that in a similar manner to the synthetic, amorphous silica, bentonite, starting from a highly liquid suspension in water with only a limited concentration, can be rapidly and durably converted into sprayable, adhesive, thickened suspensions. This effect which immediately occurs with vigorous stirring is not as pronounced as with fumed silica. With the thickening additives described in the invention the bentonite which in low concentrations only produces thin suspensions can be converted in concentrations of 1.5% in water into thickened suspensions in water usable as fire extinguishing agents and has a good adhesive action to surfaces. However, the same effect cannot be achieved with the known thickeners such as gums, polyacrylamide and the like with molar masses of >600,000, or gelatin, at least in the presently described low bentonite concentrations.

Within the scope of the invention the stabilization of the described fire extinguishing agents against frost action by the addition of compounds of the glycol or glycerol type was also found to be advantageous. Compounds effective for frost and corrosion protection, like borates, can, if necessary, be used. It has been found that a significant addition of these compounds to protect against frost does not impair the thickening action or stability of the thickened fire extinguishing agents described.

DESCRIPTION OF THE PREFERRED EMBODIMENTS

The following examples illustrate the invention without restricting the same.

Example 1 (General Preparation Example)

4–10 g of fumed silica (Acrogil 200, registered trademark of Degussa, Germany) were suspended in 190 to 196 ml of water, accompanied by stirring. The resulting suspensions are highly liquid with pH-values of about 5. If they are not strongly stirred, their outflow times in the DIN cup (4 mm nozzle) are 9 to 11 seconds, but can be up to 14 seconds if slight agglomeration occurs. If stirring takes place with an electrical stirring rod (approximately 800 r.p.m.), they become even more highly liquid with an outflow time of 9 seconds, comparable with the viscosity of water. To said suspensions are added a few drops of polyoxyethylene lauryl ether of molar mass approximately 380, or a 50% aqueous solution of polyethylene glycol of molar mass 4220, or a 50% aqueous solution of polyoxyethylene sorbitan monostearate of molar mass approximately 1200, or a concentrated solution of PEG-120 jojoba acid and PEG-120 jojoba alcohol (mainly eicosenyl or docosenyl acid/alcohol from jojoba oil in ethoxylated form), or a 20% polyethylene imine solution (Polymin SK, registered trademark of BASF, Ludwigshafen, Germany) and mixing takes place by stirring with a spatula. In all cases there is an immediately, clearly noticeable thickening to a homogeneous, thickly liquid suspension which, as a function of the silica proportion, is more or less pronounced. Outflow times of 14→35 seconds occur, or pasty consistencies are produced, which cannot be determined in the outflow cup, but have a good spraying or adhesion capacity. On accurate weighing of the necessary minimum quantities of the indicated additives, it is found that even 0.007 g (35 ppm) are effective, and that in the case of polyoxyethylene compounds there is an upper limit of approximately 1.5% in the overall mixture, above which reliquefaction occurs. If the thus obtained, long term-stable, thickened suspensions of silica undergo an even brief, vigorous stirring (e.g. with an electrical stirring rod), the thickening significantly increases and remains in this form. It is easily possible to spray these laboratory mixtures using a squeeze bottle with or without an atomizing nozzle. On almost all surfaces, such as wood in untreated or varnished form, plastic, rubber, glass or metal unproblematical adhesion is possible, even in greater layer thicknesses, without any disadvantageous change taking place to the layer by running out, sliding off or which in any other way impairs the fire extinguishing action. This in particular applies to hot surfaces, where there is no sliding off. The sprayed or sprinkled surfaces dry within 12 to 48 hours, as a function of the layer thicknesses and ambient conditions. The dry, usually flake-like silica left behind can easily be mechanically removed from the surfaces and can e.g. be readily brushed out from fabrics.

Example 2 (General Preparation Example)

4–10 g of fumed silica are mixed with in each case 0.3 g of polyoxyethylene lauryl ether or polyethylene glycol of molar mass 4220 or polyethylene glycol sorbitan monostearate (molar mass approximately 1200) or PEG-120 jojoba acid and PEG-120 jojoba alcohol, or polyethylene imine, so that a dry premix is formed. For this purpose pouring takes place onto 200 ml of water, followed by mixing with an electrical stirring rod (blade diameter 3.5 cm, approx. 800 r.p.m.), so that pasty consistencies are obtained. On adding 150 ml of water viscous suspensions are obtained with an outflow viscosity of 14–30 seconds in the DIN cup (4 mm nozzle). The characteristics of the resulting thickened silica suspensions, which are also directly obtained by adding the entire 350 ml to water, reveal no differences compared with the suspensions obtained in comparable concentrations in Example 1.

100 g of a dry premix of fumed silica (97 g) and polyoxyethylene lauryl ether (3 g) obtained according to this example are filled into a storage vessel and, using a suction hose, which via a pipe connection has a feed into a running water flow, is sucked by means of a slight vacuum into said water flow, followed by mixing and thickening, so that the water passing out of a slightly narrowed glass nozzle only a few centimetres after the mixing point already has an excellent adhesion to a glass surface. For sucking in the dry premix, it is also possible to use the suction side of a water jet pump and the sucking in of the pulverulent premix can be continued for a long time without problems or blockages. By a corresponding dimensioning of the suction feeds, regulating the water quantity and the water pressure, the thickening procedure can be controlled in the desired manner. A usable thickening according to this procedure is e.g. obtained with a silica concentration of only 1.3% in water.

Example 3

By adding a gelatin solution (which has already been described as a precipitant for silica sol, but in a weight ratio of almost 1:1 by Th. Graham, Philos. Trans, London, 1862, pp. 245/6) a thickening of the fumed silica suspension similar to Examples 1 and 2 is obtained with low concentrations of e.g. 0.1% gelatin, but such suspensions reveal microbial contamination after a relatively short period.

Example 4 (Comparison Example)

The thickened silica suspensions obtained according to Examples 1 and 2 were mixed with in each case 5% sodium carbonate and borax, so that pH-values of 11 or 9.1 were obtained. Whereas the thickening disappeared immediately after addition with all the polyoxyethylene derivatives, it remained in the case of a polyethylene imine-thickened silica suspension.

Example 5 (Comparison Example)

The thickened silica suspensions obtained according to Examples 1 and 2 were mixed with in each case small amounts of hydrochloric acid until a pH of 1 was obtained, and with in each case 2% citric acid or ascorbic acid until reaching a pH of 2 and 3. In the case of all polyoxyethylene compounds the thickening was maintained in these acid ranges. However, when mixed with polyethylene imine a reliquefaction was observed.

Example 6 (Preparation and use with a Bucket Syringe)

586 g of fumed silica were stirred with 11.68 liters of water. After leaving to stand for one hour with occasional stirring, a viscosity of 13 seconds was measured in a DIN outflow cup. 35 g of polyoxyethylene lauryl ether were added, accompanied by stirring, to this highly liquid suspension. After a short time the viscosity of the mixture rose to a pasty, readily stirrable and pourable consistency.

10 liters of the thus thickened extinguishing water were filled into a bucket syringe according to DIN 14405. The resulting, thickened extinguishing water proved to be sprayable with a multipurpose jet pipe D according to DIN 14365, part 1. During the spraying process there was a clear, further thickening of the material passing out of the jet pipe as compared with that introduced into the bucket syringe. The sprayed material had a very good adhesion to a vertical, painted concrete surface (building wall). After spraying approximately 5 liters, the remaining five liters left behind in the bucket syringe were mixed with the same amount of water by agitation and the spraying process was continued. Even with this reduction of the concentration of the thickened silica suspension, a good wall adhesion on spraying still occurred. In further spraying tests a good adhesion was found to cardboard, wood and glass. After leaving to stand for 14 months, whilst avoiding evaporation losses, no settling of the material was detected and it could still be readily sprayed.

Example 7 (Preparation and Use with a Portable Power Pump)

10 kg of fumed silica were stirred into 190 liters of water. The resulting suspension contained easily crushable particles with a diameter of 2 to 3 mm, which slowly sedimented on the bottom on leaving to stand. The supernatant suspension no longer had any particles and had the characteristics of a cloudy silica sol, which still contained 3% silica after leaving to stand for 6 weeks (gravimetric determination after drying and baking). The viscosity of the sedimented silica sol was 9 seconds in the DIN outflow cup after 6 weeks storage, but 11 seconds directly following preparation, i.e. with the still suspended particles. Samples of the sol clarified or purified after settling and those still mixed with suspended matter were convertable with the additives referred to in Example 1 and in the concentrations given therein into a thickened silica suspension. The still unthickened suspension was stirred with a paddle mixer and the resulting 200 liters were separated into two identical parts. One part was stored in sealed form without further additives for observing the long term behaviour. Over a twelve month period there was a slow thickening and settling on the bottom on leaving to stand of said silica suspension not provided with the indicated additives. However, it was still mixable and sprayable through nozzles and became highly liquid again by thixotropizing. It could be thickened by the additives referred to in Example 1 and converted into a thickened, aqueous silica suspension suitable as an adhering fire extinguishing agent. The other part of the mixture was mixed with 250 g of polyoxyethylene lauryl ether immediately following preparation and stirred with a paddle mixer, which led within approximately 30 seconds to the uniform thickening of the entire silica suspension.

The thus thickened extinguishing water was sprayed in problem-free manner as both a full jet and as a spray jet using a portable power pump TS 2/5 according to DIN 14410 with a multipurpose jet pipe C according to DIN 14365, part 1. As in Example 7, there was a clear further thickening of the extinguishing water by the pumping and spraying process. Good ranges and an excellent wall adhesion to vertical surfaces were obtained. As in Example 7, if necessary, further thinning with water was possible whilst maintaining the characteristics.

After use, the thickened, sprayed extinguishing water could be taken up again by shovelling or suction, so that any fire resulting products contained therein only passed to a limited extent, if at all, into the soil.

The extinguishing water from this mixture thickened by adding polyoxyethylene lauryl ester, like the silica suspension without the additive, was left to stand for 12 months. There was substantially no change to its use behaviour and no settling of residues on the bottom of the vessel. Without preservative measures, there were no clear bacterial contamination phenomena and it must be pointed out that a sample used in an extinguishing test, which was contaminated by a certain amount of soil had, on the basis of its smell, been contaminated after a few weeks. However, no special preservation measures are required in the case of clean storage.

Example 8 (Fire Extinguishing Test)

A test fire with solid fuels of fire Class A (wooden crib, 40×40 cm, 7 layers, preburning time 4 min.) was extinguished with a spray jet using thickened extinguishing water, prepared according to Example 7 and set to 2.5 and 3% $SiO_2$ content. Compared with the extinguishing test with water, for extinguishing purposes only ¼ of the extinguishing agent quantity was consumed and the number of reignitions decreased to ¼. The adhering layer of thickened extinguishing water delayed or prevented fire propagation and ignition of those parts of the flammable material not affected by the fire. The large amount of steam formed reveals that the thickened water applied is almost entirely available for cooling and extinguishing purposes, because it does not run off the burnable parts and into the ground. The agent is suitable for extinguishing flammable materials such as wood, plastic, rubber, wooden materials, textiles and other organic, solid materials.

Example 9 (Fire Extinguishing Test)

A 13-A fire (according to BFS 5423) was extinguished with an extinguishing water formulation prepared with a 3% thickened silica suspension according to Example 7. The extinguishing agent consumption up to complete extinguishing was only 1.7 kg. Only 50 g of silica were consumed for complete extinguishing of the fire. The quantity of firewood used can, by its very nature, contain a multiple of this silica quantity in its ash.

Example 10 (Comparison Example)

A highly liquid suspension of 4% fumed silica in water without the described thickening additives was used for extinguishing a test fire of Class A (like Example 8). Compared with water alone, only slightly less unthickened suspension was used in order to achieve the same extinguishing result. The number of reignitions obtained was comparable to that with water alone. This shows that the good extinguishing effect is dependent on the presence of a thickened, aqueous suspension of amorphous, synthetic silica.

Example 11

500 ml of an approximately 3% silica sol was prepared from a sodium silicate solution by treating with a strong, acid cation exchanger. The pH of the sol was approximately 5 and was exposed to a shearing action in a blender for 5 minutes. It suffered no visible changes. After adding 2 g of a 20% polyethylene imine solution in water and brief blending there was an immediate thickening of the silica sol, without solidifying to a gelatinous mass, had a viscosity of 20 seconds in the outflow cup, remained sprayable and adhered to surfaces. After repeated shearing in the blender the viscosity was still 14–15 seconds. There would consequently appear to be a slight thixotropy, but this is not disadvantageous for spraying.

Example 12

500 ml of an approximately 7% silica sol was prepared from a sodium silicate solution by treating with a strong, acid cation exchanger. The pH of the sol was approximately 5. The silica sol was left to stand in order to gel and the resulting gel was stored for 2 weeks. A 3% suspension in water was then prepared in a blender, which was sprayable and had good adhesion action. Its viscosity was 18 seconds in the DIN cup with 4 mm nozzle.

Example 13

A suspension set to an approximately 2.5% silica content by diluting from an approximately 3% suspension of amorphous silica in water had an outflow viscosity of approximately 14–15 seconds. This suspension was used for extinguishing a standard fire of Class A. The necessary extinguishing agent quantity was ⅓ of that of water used as the comparison extinguishing agent and the number of reignitions was halved compared with water. Therefore the action is much better than water, but not quite as good as that of a thickened silica suspension set to 2.5% and prepared from a fumed silica according to Example 7 (reduction of the extinguishing agent quantity compared with water to approx. ¼, reignitions ¼ compared with water).

Example 14

A suspension of 8 g of Aerosil 200 was prepared in 150 ml of water and of this 80 g were mixed with 35 g of propylene glycol (A) and 69 g with 46 g of propylene glycol (B). A and B were in each case thickened by adding four drops of polyoxyethylene lauryl ether. Both were stored for 48 hours in the refrigerator at −12° C., B appearing thick-movable and A thick-syrupy. After thawing the thickening obtained after adding the thickener was the same as before freezing.

Example 15

120 ml of a thickened suspension of 3% silica in water according to Example 1 were mixed with 5 g of sodium hydrogen carbonate. The outflow viscosity was 20 seconds in the DIN cup (4 mm). On spraying onto hot surfaces, this mixture revealed good adhesion characteristics. On evaporating the water there was a strong gas evolution of finer bubble nature than in the case of the extinguishing agent without sodium hydrogen carbonate. After adding potassium hydrogen carbonate a similar result was found and due to the higher solubility up to 34% could be dissolved in the suspension. The outflow viscosity in the DIN cup was 35 seconds. The pH of these mixtures was 8.6. It was found that the sprayed on layers remained moist for a longer time.

Example 16

6 g of Aerosil 200 were suspended in a solution of 10 g of potassium sulphate in 195 g of water and the resulting highly liquid suspension was mixed with a few drops of polyoxyethylene lauryl ether and stirred. The resulting thickening led to an outflow viscosity of 20 seconds in the DIN cup (4 mm).

With regards to the additives in salt form described in Examples 15/16, it is pointed out that these mixtures do not act in rheopectic manner, but that with vigorous shearing are not thixotropized to such an extent that the adhesion action to surfaces is significantly impaired. However, on spraying on walls there was more marked running with these mixtures.

Example 17

83 g of water were blended with 7 g of fumed silica and 0.1 g of polyethylene imine (or the same quantity of fatty alcohol polyglycol ether of molecular weight >300, fatty acid polyglycol ester of molecular weight >300, polyoxyethylene sorbitan mono-fatty acid ester, or polyethylene glycol of molecular weight >700) and mixed by stirring. The resulting paste was filled into a plastic bag. The thickness of the thus produced cushion was approximately 8 mm and the dimensions were approximately 10×10 cm. Cable portions of different diameters were placed on the cushion. A horizontal, 3 cm wide gap was covered by said cushion. The gap was then subject to flame action from below with a gas burner. Temperatures of approx. 700° C. occurred on the underside of the cushion. After approx. 20 min. flame application the cables were undamaged.

Example 18

A cushion as described in Example 17 was produced with an insert from a plastic grating. The cushion was provided with velcro strip closures at the ends. The resulting cushion was placed round a polypropylene pipe with a diameter of 40 mm according to DIN 19560 and closed in the manner of a sleeve using the velcro band. The thus protected pipe part was subject to flame action from below by a petrol-produced fire, so that the flames moved passed both sides of the pipe or sleeve. There was no damage or softening of the pipe after 20 minutes.

Example 19

A cushion, as described in Example 17 was filled with a paste having an addition of 10 g of sugar dissolved in water. The cushion was hung up vertically and subject to the action of a gas burner from the front. A cable located behind it was undamaged after 20 minutes. A falling apart of the cushion as is the case without a sugar addition, did not occur due to the carbon skeleton-forming sugar.

Example 20

10.5 g of a precipitation silica were suspended in 150 ml of water. 0.2 g of polyethylene imine were added to this highly liquid suspension, followed by vigorous stirring. The suspension thickened and had an outflow viscosity of 18 seconds.

Example 21

5 g of bentonite (Korthix H-NF or GK 129-H, trademark of Amberger Kaolinwerke, Amberg, Germany, or Bentonite DAB 9) were suspended in 200 ml of water, accompanied by stirring with an electrical stirring rod. To this highly liquid suspension with a viscosity of 11 seconds in the DIN cup (4 mm) were added 0.7 g of a 20% polyethylene imine solution in water, followed by stirring with the stirring rod. The outflow time in the 4 mm DIN cup was then 14–15 seconds and the spraying and adhesion behaviour was good. On heating the sprayed surfaces no adhesion problems occurred and a large amount of steam was formed.

Example 22

As Example 21, but using 3 g of bentonite. The outflow time was 13 seconds and the spraying behavior good, the adhesion behaviour to cold surfaces satisfactory and on hot surfaces good.

Example 23 (Comparison Example)

Like Example 21, but accompanied by the addition of 20 ml of a mixture of 1 g of guar gum in 100 ml of water. There was only a slight thickening action and a clear aqueous phase separated on the bottom of the cup. Guar gum alone does not act as a thickener in the case of the present low bentonite concentrations.

We claim:

1. A composition forming a thickened aqueous fire extinguishing suspension, said composition consisting essentially of:

(a) fumed silica;

(b) water in sufficient amount to dissolve said silica and form an amorphous, synthetic silica of 1% to 9% by weight in said water;

(c) a thickening agent of between 0.003% and about 0.5% by weight, said thickening agent selected from the group consisting of polyethylene glycols, polypropylene glycols, both with molar masses between 700 and 600,000, and the derivatives thereof, said thickening agent providing a thickened suspension through irreversible rheopexy, whereby a sprayable, adhesive, thickened suspension is formed; and (d) optionally, the thickened suspension includes an additional additive to improve the fire extinguishing action, said additive selected from the group consisting of hydrogen carbonates, borates, and ammonium phosphates.

2. A composition for a fire extinguishing suspension according to claim 1, wherein said thickening agent includes polyoxyethylene fatty alcohol ethers or polyoxyethylene fatty acid esters.

3. A composition for a fire extinguishing suspension according claim 1 wherein said suspension includes an additional additive to improve the extinguishing action, said substance selected from the group consisting of hydrogen carbonates, borates, and ammonium phosphates.

4. A process for making a thickened aqueous fire extinguishing suspension consisting essentially of the following steps:

(a) mixing a fumed silica and water to provide a suspension of amorphous, synthetic silica in water, said suspension having between 1% and 9% by weight of synthetic silica;

(b) adding a thickening agent to said suspension with mixing to form a thickened suspension, said thickened suspension having between 0.003% and about 0.5% by weight of said thickening agent, said thickening agent selected from the group consisting of polyethylene glycols, polypropylene glycols, both with molar masses between 700 and 600,000, and the derivatives thereof;

(c) optionally mixing an additional additive into the thickened suspension to improve the fire extinguishing action, said additive selected from the group consisting of hydrogen carbonates, borates, and ammonium phosphates;

(d) retaining said thickened suspension in a fire extinguishing container;

(e) discharging the thickened suspension from the container to generate a shearing action for additional thickening of the thickened suspension, whereby a sprayable, adhesive, thickened suspension is produced for extinguishing fires; and (f) optionally, the said process further comprises the additional step of stirring or otherwise agitating the thickened suspension to generate a sheering action for additional thickening of the thickened suspension, said stirring to occur before discharging the thickened suspension either before or after retaining the thickened suspension in the fire extinguishing container.

5. A process for making a thickened aqueous fire extinguishing suspension according to claim 4, further comprising the additional step of stirring or otherwise agitating the thickened suspension to generate a shearing action for additional thickening of the thickened suspension, said stirring to occur before discharging the thickened suspension, either before or after retaining the thickened suspension in the fire extinguishing container.

6. A process for making a thickened aqueous fire extinguishing suspension according to claim 4, further comprising the additional step of mixing an additional additive into the thickened suspension to improve the extinguishing action, said additive selected from the group consisting of hydrogen carbonates, borates, and ammonium phosphates.

7. A process for making a thickened aqueous fire extinguishing suspension according to claim 4, wherein the thickened suspension has a viscosity measured as an outflow time in the DIN cup (4 mm) of greater than 14 seconds.

8. A process for making a thickened aqueous fire extinguishing suspension according to claim 7, wherein the viscosity measurement ranges from 14 to 34 seconds.

9. A process for making a thickened aqueous fire extinguishing suspension consisting essentially of the following steps:

(a) mixing a fumed silica and a thickening agent, said thickening agent selected from the group consisting of polyethylene glycols, polypropylene glycols, both with molar masses between 700 and 600,000, and the derivatives thereof;

(b) adding water to said mixture of fumed silica and thickening agent with mixing to create a thickened suspension of amorphous, synthetic silica in water, said thickened suspension having between 1% and 9% by weight of synthetic silica and having between 0.003% and about 0.5% by weight of said thickening agent;

(c) optionally mixing an additional additive into the thickened suspension to improve the fire extinguishing action, said additive selected from the group consisting of hydrogen carbonates, borates, and ammonium phosphates;

(d) retaining said thickened suspension in a fire extinguishing container;

(e) discharging the thickened suspension from the container to generate a shearing action for additional thickening of the thickened suspension, whereby a sprayable, adhesive, thickened suspension is produced for extinguishing fires; and (f) optionally, the said process further comprises the additional step of stirring or otherwise agitating the thickened suspension to generate a sheering action for additional thickening of the thickened suspension, said stirring to occur before discharging the thickened suspension either before or after retaining the thickened suspension in the fire extinguishing container.

10. A process for making a thickened aqueous fire extinguishing suspension according to claim 9, further comprising the additional step of stirring or otherwise agitating the thickened suspension to generate a shearing action for additional thickening of the thickened suspension, said stirring to occur before discharging the thickened suspension, either before or after retaining the thickened suspension in the fire extinguishing container.

11. A process for making a thickened aqueous fire extinguishing suspension according to claim 9, further comprising the additional step of mixing an additional additive into the thickened suspension to improve the extinguishing action, said additive selected from the group consisting of hydrogen carbonates, borates, and ammonium phosphates.

12. A process for making a thickened aqueous fire extinguishing suspension consisting essentially of the following steps:

(a) mixing a fumed silica and a thickening agent, said thickening agent selected from the group consisting of polyethylene glycols, polypropylene glycols, both with molar masses between 700 and 600,000, and the derivatives thereof;

b) retaining said mixture of fumed silica and thickening agent in a dry condition in a first chamber of a fire extinguishing container;

c) retaining water in a second chamber in the fire extinguishing container; and d) simultaneously mixing and discharging said water and said mixture of fumed silica and thickening agent to create a thickened suspension of amorphous, synthetic silica in water and to generate shearing action for additional thickening of the thickened suspension, said thickened suspension having between 1% and 9% by weight of synthetic silica and having between 0.003% and about 0.5% by weight of said thickening agent, whereby a sprayable, adhesive, thickened suspension is produced for extinguishing fires.

* * * * *